United States Patent [19]

Uliana et al.

[11] Patent Number: 5,087,173
[45] Date of Patent: Feb. 11, 1992

[54] SEATING AND ALIGNMENT DETECTING DEVICE

[75] Inventors: Anthony R. Uliana, Brownsburg; Joel E. Mowatt, Zionsville, both of Ind.

[73] Assignee: General Motors Corporation, Detroit, Mich.

[21] Appl. No.: 580,992

[22] Filed: Sep. 12, 1990

[51] Int. Cl.$^5$ .............................................. B63H 1/20
[52] U.S. Cl. ........................... 416/204 A; 416/204 R; 416/197 C; 74/527; 29/464; 411/348
[58] Field of Search ............... 416/197 C, 180, 204 R, 416/204 A; 74/527; 411/348; 29/464–468

[56] References Cited

U.S. PATENT DOCUMENTS

| | | | |
|---|---|---|---|
| 2,815,971 | 12/1957 | Guinane | 411/348 |
| 3,043,563 | 7/1962 | Gray | 411/348 |
| 3,052,940 | 9/1962 | Sellers | 411/348 |
| 3,387,768 | 6/1968 | Zoehfeld | 416/204 |
| 3,476,219 | 11/1969 | Lauer | 416/197 C |

Primary Examiner—Edward K. Look
Assistant Examiner—Therese M. Newholm
Attorney, Agent, or Firm—Donald F. Scherer

[57] ABSTRACT

A structural arrangement for detecting improper positioning between a hub. The structural arrangements utilize a bore which axially penetrates a stepped-down end portion of the shaft to receive a fastening means by which the hub may be secured to the shaft. A blocking bore extends radially through the stepped-down end portion of the shaft to communicate between the bore and the exterior of the shaft. A blocking member is received within the blocking bore and is movable radially therealong. A cam flange extends radially inwardly from the hub member and presents a blocking surface and a releasing surface on the radially inner extent thereof. The blocking surface is disposed in radial opposition to the blocking bore when the hub member is improperly positioned with respect to the shaft and the releasing surface is disposed in radial opposition to the blocking bore when the hub member is properly disposed with respect to the shaft. The blocking member has a radial dimension such that the blocking member will be forced to extend within the axially oriented bore so long as the hub member is improperly positioned with respect to the shaft in order to preclude the fastening means from being secured within the bore and yet the blocking member will retract to clear the bore when the releasing surface is radially opposed to the blocking bore, as occurs when the hub is properly disposed on the shaft in order to permit the fastening means to enter the bore.

8 Claims, 3 Drawing Sheets 5,087,173

SEATING AND ALIGNMENT DETECTING DEVICE

TECHNICAL FIELD

The present invention relates to structural arrangements which mechanically detect improper seating and/or misalignment between interconnected members. More particularly, the present invention is directed to a structural arrangement adapted not only for detecting improper positioning between a hub and a shaft when the hub is mounted concentrically about the exterior of the shaft, but also for preventing the hub from being fastened to the shaft when the aforesaid improper seating and/or misalignment is detected.

Specifically, the present invention is directed to a structural arrangement for detecting and preventing improper positioning of a torque converter on a turbine output shaft by precluding the fastening means—which secures the output hub of the turbine member to the turbine output shaft—from being tightened unless all driving connections presented from the torque converter are properly aligned and seated.

BACKGROUND OF THE INVENTION

It must be appreciated that one highly acceptable and widely employed means by which to effect a driving connection between the turbine hub of a torque converter and the output shaft of the torque converter employs a concentric engagement therebetween. In addition, a driving connection between the rotating cover on the impeller, or pump, portion of the torque converter and the transmission pump and/or a power take-off, may be achieved by the engagement of a plurality of axially oriented teeth on a drive hub presented from the impeller portion of the torque converter with an opposed plurality of axially oriented teeth on the drive gear of a transmission pump or power take-off, in what is often designated as a "running fit" therebetween.

The several driving connections heretofore described are generally secured by a single fastening means in the nature of a bolt which is received within an axially oriented threaded bore in the end of the turbine output shaft. To expand upon the explanation of a typical power train which utilizes a torque converter to connect between the engine and the transmission of a vehicle, as well as between the engine and the transmission pump and/or a power take-off, the torque converter is filled with a fluid, such as oil, and the impeller portion of a typical torque converter unit is conventionally connected to the crankshaft of a power source, such as an engine, by way of a flex-plate that is secured to the impeller cover.

A typical torque converter contains not only the impeller and a turbine, but also a stator or reactor assembly and a combined pressure plate and damper assembly which, when applied, provides a direct mechanical coupling of the engine to the turbine output shaft. The direct driving connection effected by the combined pressure plate and damper assembly couples the engine directly to the transmission by a series of controls which are not germane to the present invention and they will not, therefore, be further described. Rather, the present invention is directed to the structural arrangement of the fastening connection between the turbine hub and the turbine output shaft as affected by the driving connections between those two components as well as between the impeller cover and the transmission pump and/or a power take-off.

In a typical installation, the turbine hub is received concentrically about the turbine output shaft so that a plurality of radially inwardly directed splines on the interior of the turbine hub interact with a complimentary plurality of radially outwardly directed splines on the turbine output shaft to accomplish the driving connection therebetween. As such, rotation of the turbine hub will simultaneously effect rotation of the turbine output shaft. In addition, a plurality of axially oriented teeth on a drive hub presented from the rotating impeller cover engage an opposed plurality of teeth on the transmission pump and/or the power take-off, to effect a driving connection therebetween so that rotation of the impeller cover will effect operative rotation of the transmission pump and/or the power take-off.

The aforesaid driving connection between the turbine hub and the turbine output shaft as well as the driving connection between the drive hub on the impeller cover and the transmission pump and/or the power take-off, are typically secured by the aforesaid fastening means, such as a bolt, which is tightened into the axially oriented bore in the end of the turbine output shaft. The fastening means operatively engages the turbine hub, as through a thrust washer interposed therebetween, axially to secure the torque converter in position on the output shaft, and the fastening means, if a bolt, is generally torqued to a force moment of prescribed value.

Unfortunately, the driving connection between the turbine hub and the output shaft, as well as the driving connection between the drive hub presented from the impeller cover and the transmission pump and/or the power take-off, cannot be visually observed during assembly. Thus, should any one or more of these connections be misaligned or improperly seated, that fact might well go unnoticed, and so long as the fastening means can be secured within the axially oriented receiving bore in the output shaft, it can be tightened, and the improper seating or misalignment, will continue to go unnoticed. When the fastening means is secured to the proper tightness, as determined by meeting the specifications for the proper force moment, damage can result to the torque converter unit, the transmission pump and/or the transmission unit as a result of an excessively large axial load having been applied to whichever of the driving connections are misaligned inasmuch as the fastening means, by virtue of having been torqued to the prescribed force moment, is applying an improper axial load to the misaligned, or improperly seated, driving connection(s). However, the misalignment is generally found during final assembly and test with an engine. Obviously, this results in additional expense required for teardown and reassembly.

SUMMARY OF THE INVENTION

It is, therefore, a primary object of the present invention to provide a structural arrangement which will not only detect but also preclude improper seating and/or misalignment between the driving connections effected when a torque converter is mounted on its output shaft.

It is a another object of the present invention to provide a structural arrangement, as above, which is not only relatively uncomplicated and economical to manufacture and use, but is also virtually foolproof in preventing improper seating and/or misalignment in the drive connections between a torque converter and those members with which the driving connections presented from the torque converter interact.

It is a further object of the present invention to provide a structural arrangement, as above, which prevents the fastening means from being secured within the axially oriented bore in the output shaft when the torque converter is improperly seated and/or misaligned with respect to the output shaft or when there is improper meshing of the driving connections between the torque converter and the transmission pump and/or a power take-off.

It is yet another object of the present invention to provide a structural arrangement, as above, which employs a blocking means that is capable of radial displacement so that it cooperates with the turbine output shaft to prevent the fastening means from being secured within the axially oriented bore in the output shaft when the turbine hub is not properly positioned on, or axially along, the output shaft.

It is a still further object of the present invention to provide a structural arrangement, as above, which employs a blocking means that is capable of radial displacement and which cooperates with the turbine output shaft to prevent the fastening means from being tightened into the axially oriented bore in the output shaft when the driving engagement between the drive hub on the impeller cover is either improperly seated, or misaligned, with respect to the transmission pump and/or the power take-off.

These and other objects of the invention, as well as the advantages thereof over existing and prior art forms, which will be apparent in view of the following detailed specification, are accomplished by means hereinafter described and claimed.

In general, a structural arrangement for detecting and preventing improper positioning between a hub member mounted concentrically about the exterior of a shaft, and embodying the concepts of the present invention, employs one or more radially displaceable blocking means which interact with the shaft in response to the location of the hub member to preclude a fastening means from being secured within a bore in the shaft when any improper seating or misalignment occurs relative to the driving connections associated with the hub and either between the shaft or other devices driven by the assembly from which the hub is presented, but which freely permits the fastening means to be secured within the bore when the driving connections are properly seated and aligned.

The present invention is described in conjunction with four alternative embodiments of a structural arrangement embodying the concepts of the present invention, the various alternative arrangements disclosed being deemed sufficient to effect a full disclosure of the subject invention. The exemplary detecting and preventing devices are described in detail without attempting to show all of the various forms and modifications in which the invention might be embodied; the invention being measured by the appended claims and not by the details of the specification.

DESCRIPTION OF AN EXEMPLARY EMBODIMENT

Figure 1:
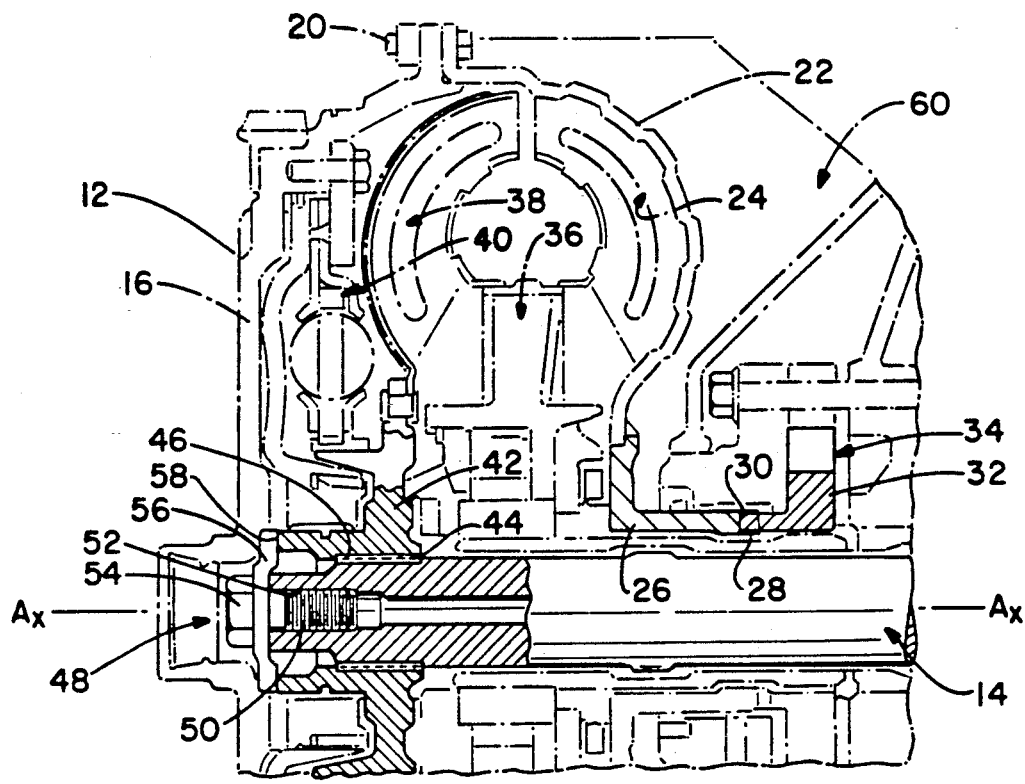
FIG. 1 is a vertical cross section through a portion of a prior art torque converter, said cross section depicting not only the hereinafter employed arrangement by which the hub on the turbine cover of the torque converter is operatively secured to the turbine output shaft but also the customary manner by which the rotating cover of the converter pump effects a driving connection with a transmission pump —the axis of rotation for the rotatable elements in the assembly being designated as axis $A_x$—$A_x$.
Figure 2:
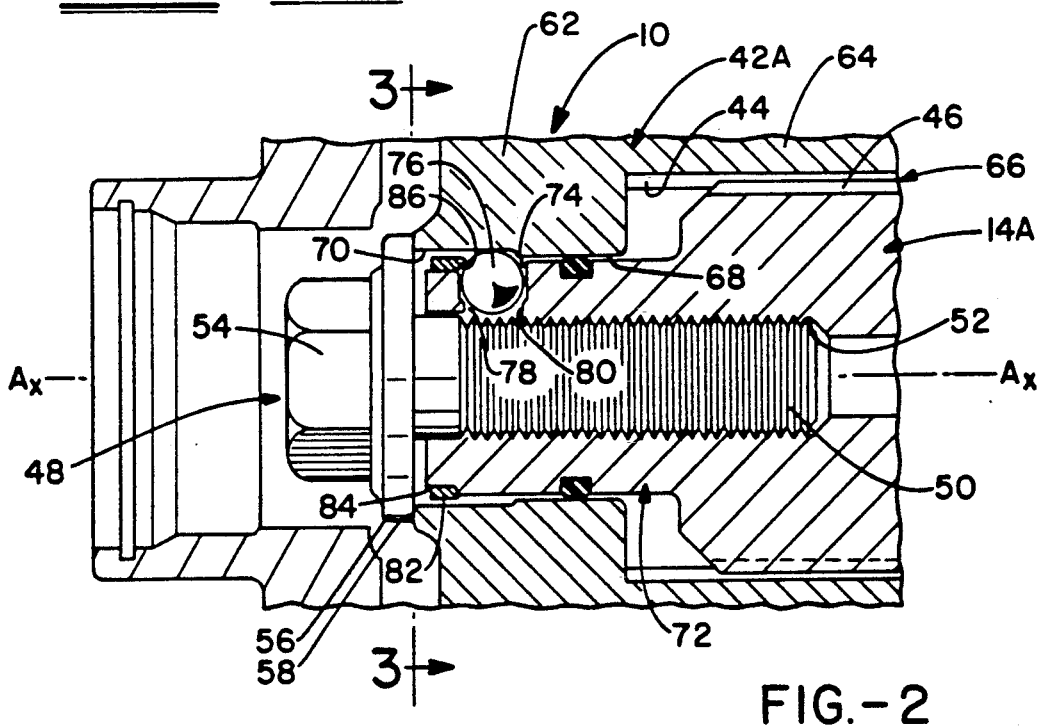
FIG. 2 is an enlarged portion of FIG. 1 which has been modified in accordance with the concepts of the present invention.
Figures 3, 4, 5, 6:
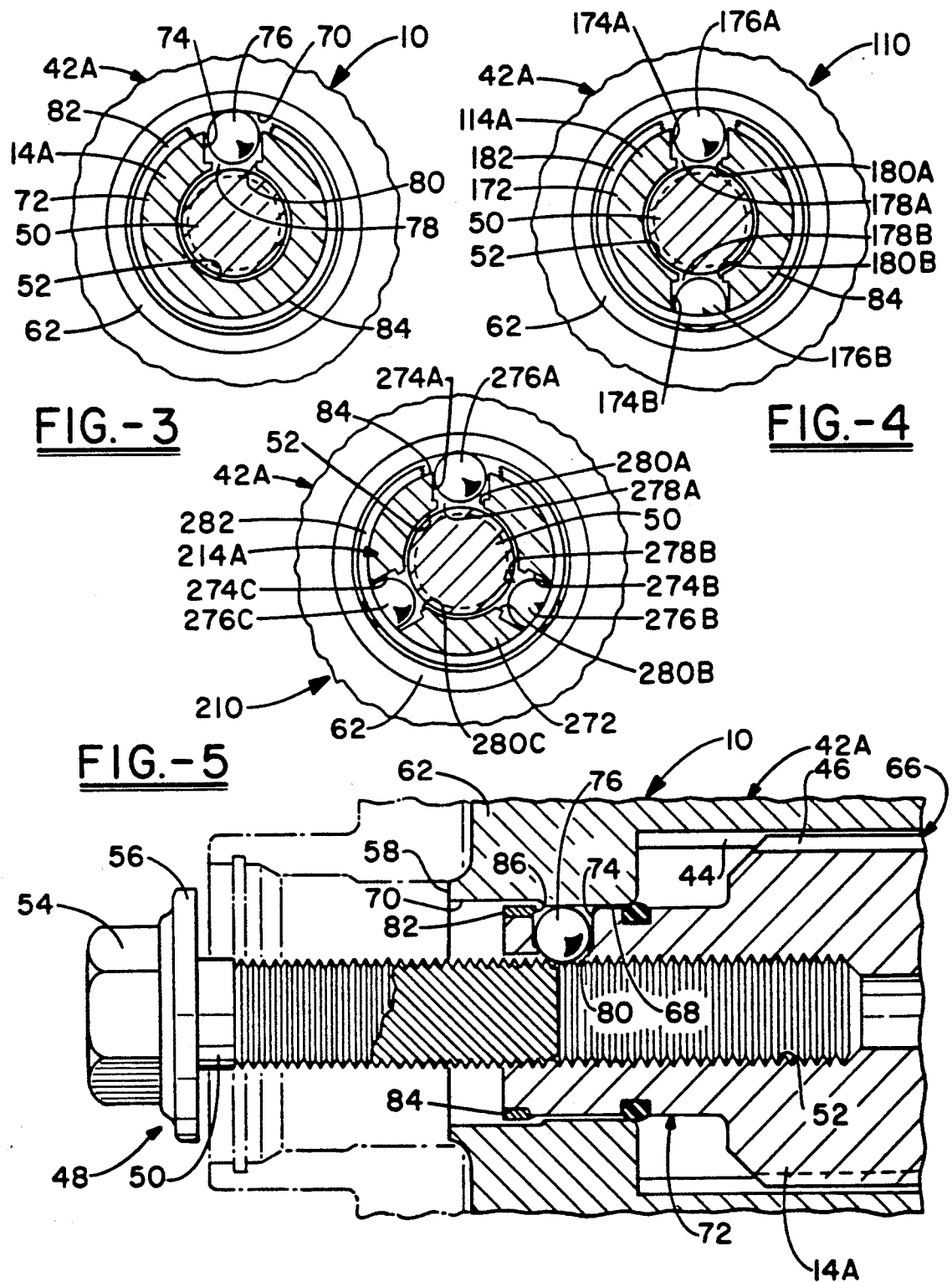
FIG. 3 is an enlarged, transverse section, taken substantially along line 3—3 of FIG. 2 to depict one embodiment of the invention.
FIG. 4 is a transverse section similar to FIG. 3 but depicting an alternative embodiment of the present invention.
FIG. 5 is a transverse section similar to FIGS. 3 and 4 but depicting a third embodiment of the present invention.
FIG. 6 is a view similar to FIG. 2 but illustrating how the present invention prevents the fastening means from being secured within an axially oriented bore in the turbine output shaft when one or more of the driving connections associated with the torque converter are either improperly seated or misaligned; and, FIG. 7 is a transverse section similar to FIGS. 3-5, but depicting a fourth embodiment of the invention.

One representative form of a structural arrangement embodying the concepts of the present invention is designated generally by the numeral 10 on FIGS. 2 and 3 of the accompanying drawings. However, before describing the details of structural arrangement 10, reference should be made to FIG. 1 of the drawings wherein the typical prior art arrangement for securing a torque converter unit 12 to an output shaft 14 is depicted. The output shaft 14, and the torque converter unit 12 mounted thereon, rotate about their common axis of rotation, designated as $A_x$—$A_x$ on the drawings.

Those elements depicted in FIG. 1 which are pertinent to the present invention are illustrated in solid lines, and the other, less pertinent, elements are illustrated in broken, or phantom, lines and are included solely for the purpose of representing the environment within which the present invention has particular significance.

Conventionally, a torque converter unit 12 employs an end cover 16 which may be drive-connected through a flex plate (not shown) to the crankshaft (not shown) presented from a source of rotational power such as that provided by a vehicle engine (also not shown). The end cover 16 is also operably connected, as by bolts 20, to the cover 22 of the impeller 24 in the torque converter unit 12, and the impeller cover 22 is, in turn, conventionally secured, as by welding, to a drive hub 26 which circumscribes the output shaft 14 for rotation with, and with respect to, the output shaft 14. A plurality of axially oriented teeth 28 are presented from the drive hub 26 to interact with an opposed plurality of drive teeth 30 presented from the gear hub 32 of a transmission pump 34 that is housed within the torque converter unit 12. The aforesaid interconnection of the teeth 28 and 30 are often designated as a "running fit", and it will be appreciated from the foregoing description that rotation of the end cover 16 in the torque converter unit 12 will result in the direct operation of the transmission pump 34 by virtue of the mechanical connection between the flex-plate 16 and the drive hub 26 achieved by the impeller cover 22.

The torque converter unit 12 is further characterized by the customary stator 36, turbine 38, and a combined pressure plate and damper assembly 40. The turbine 38 is mechanically affixed to a turbine hub 42 which is concentrically disposed about the output shaft 14 and which rotates with the turbine 38. A driving connection is effected between the turbine hub 42 and the output shaft 14 by a plurality of radially inwardly extending splines 44 on the interior of the turbine hub 42 which interact with an opposed plurality of splines 46 which extend radially outwardly from the output shaft 14. The turbine hub 42, once positioned in its axially innermost seated position, is secured against axially outwardly translation along the output shaft 14, and maintained in driving connection therewith, by virtue of a fastening means 48 which may comprise a bolt 50 that is adapted to be secured within an axially oriented bore 52 in the end of the output shaft 14.

The axially oriented bore 52 may be threaded to permit the bolt 50 to be tightened within the bore 52. The head 54 of the bolt 50 engages a washer 56 which is forced, by the head 54 of the bolt 50, against the outer edge 58 of the turbine hub 42 to maintain it in its seated position on the output shaft 14. In this way the fastening means 48 not only secures the torque converter unit 12 onto the output shaft 14 but thereby also maintains the driving interconnection between the torque converter unit 12 and the output shaft 14 as well as the transmission pump 34 and/or a power take-off (not shown).

By reference to FIG. 1 it may be appreciated that the torque converter unit 12 may be mounted as a pre-assembled unit. That is, a completely pre-assembled torque converter unit 12 is positioned in axial alignment with the output shaft 14 and then translated axially into its operative position on the output shaft 14. Although engagement of the drive components can not be visually observed, proper assembly requires not only that the teeth 28 on the drive hub 26 properly mesh with the teeth 30 on the gear hub 32 of the transmission pump 34 but also that the splines 44 on the turbine hub 42 properly engage the splines 46 on the output shaft 14. The engagement of the aforesaid teeth 28 and 30 as well as the splines 44 and 46 is made blind, because those elements are located either interiorly of the torque converter unit 12 or within the confines of the extension 60 of the transmission housing within which the torque converter unit 12 is received and can not, therefore, be visually observed during the process of tightening the fastening bolt 50.

By way of explanation, if, for example, the teeth 28 and 30 do not properly mesh, the person mounting the torque converter unit 12 would not be aware of the problem, and according to the prior art arrangement, the fastening bolt 50 could, nevertheless, be tightened into the threaded bore 52 in the end of the output shaft 14. As the fastening bolt 50 is torqued to the force moment prescribed, that load would be applied axially by the teeth 28 against the teeth 30, and such axial loading would impart an undue thrust on the gear hub 32 of the transmission pump 34. Operating the transmission pump 34 when it is subjected to an axial load substantially above that for which the pump 34 was designed will eventually result in damage to the transmission (not shown), the transmission pump 34 and/or the torque converter unit 12.

One embodiment of a structural arrangement 10 which serves to detect improper seating and/or misalignment and prevent the fastening bolt 50 from being secured within the threaded bore 52 in turbine output shaft 14A is illustrated in FIG. 2 of the drawings. To accommodate the structural arrangement 10 the output shaft 14A and the turbine hub 42A are slightly modified from that configuration of the shaft 14 and the turbine hub 42 depicted in FIG. 1. With reference to the turbine hub 42A, an annular cam flange 62 extends radially inwardly from the body portion 64 of the turbine hub 42A. The cam flange 62 is located axially outwardly from the splines 44, and the splines 44 interact with opposing splines 46 on the torque transfer portion 66 of the output shaft 14A in the fashion heretofore described with respect to the prior art depicted in FIG. 1. The radially innermost terminus of the cam flange 62 has a smaller internal diameter on the axially inner portion thereof. The smaller internal diameter defines a blocking surface 68, the purpose of which shall be more fully hereinafter described. The inner terminus of the cam flange 62 also has a larger internal diameter at the axially outer portion thereof, and the larger internal diameter defines a releasing surface 70, the purpose of which will also be hereinafter more fully described.

The output shaft 14A terminates in an end portion 72 which has a diameter that is lesser than the diameter of the torque transfer portion 66 such that the end portion 72 is stepped-down from the torque transfer portion 66. The axially oriented bore 52 penetrates the end portion 72 and extends interiorly thereof.

At least one radially oriented, blocking bore 74 communicates with the axially oriented, threaded bore 52. The internal diameter of the blocking bore 74 is such that a blocking member 76, which in the embodiment depicted in FIGS. 2 and 3 comprises a ball, may move freely radially within the blocking bore 74. However, the radially inner opening 78 of the blocking bore 74, located at the intersection of the blocking bore 74 with the axially oriented bore 52 is restricted, as at 80, such that the blocking member 76 may penetrate partially into, but not completely enter, the axially oriented bore 52.

A confining ring 82 is removably secured to the circumferentially outer surface 84 on the stepped-down end portion 72 of the output shaft 14A in such a way that the confining ring 82 interacts with the radially outer extent of the blocking bore 74. The confining ring 82 allows the blocking member 76 to extend radially outwardly of the blocking bore 74 to only a limited extent. The restriction 80 and the confining ring 82 serve to maintain the blocking member 76 within the blocking bore 74. More importantly, the radial dimension of the blocking member 76 must be equal to the radial dimension of the blocking bore 74 plus the dimensional extent to which the blocking member 76 is required to extend axially inwardly from the blocking bore 74 into the threaded bore 52, and plus the dimension between the radially outer extent of the blocking bore 74 and the blocking surface 68 when the blocking surface 68 is disposed in radial opposition to the blocking bore 74.

Accordingly, when the blocking surface 68 on the cam flange 62 is disposed in radially outward opposition to the blocking bore 74, the blocking member 76 will engage the blocking surface 68 to preclude the blocking member 76 from moving radially outward in the blocking bore 74 sufficiently to clear the threaded bore 52. Conversely, when the releasing surface 70 on the cam flange 62 is disposed in radially outward opposition to the blocking bore 74, the blocking member 76 will be permitted to translate radially outwardly to a sufficient extent to clear the axially oriented bore 52 and thereby permit the fastening bolt 50 to be tightened into the bore 52, which may be threaded to accommodate the fastening bolt 50.

To accomplish the foregoing objective, the releasing surface 70 must be disposed radially outwardly with respect to the blocking surface 68 by an amount at least equal to the extent to which the blocking member 76 extends radially inwardly of the threaded bore 52 when the blocking surface 68 is disposed in radial opposition to the blocking bore 74.

As depicted, the confining ring 82 may have a tapered edge 86 which permits the blocking member 76 to move radially outwardly of the blocking bore 74 only a specific distance. That distance must, however, be sufficient to permit the blocking member 76 to clear the threaded bore 52 in order to obviate interference between the blocking member 76 and the fastening bolt 50 when the releasing surface 70 is disposed in radial opposition to the blocking bore 74.

FIG. 2 depicts the turbine hub 42A in its proper axial position when a running fit engagement between the teeth 28 on the drive hub 26 properly mesh with the teeth 30 on the gear hub 32 of the transmission pump 34 has been achieved. In this condition, and as illustrated, the fastening bolt 50 may be fully tightened into the threaded bore 52, because the blocking member 76 may be moved radially outwardly along the blocking bore 74 a sufficient distance to allow the blocking member 76 to retract from the threaded bore 52. As should now be apparent, this result obtains because the releasing surface 70, and not the blocking surface 68, is disposed in radially opposition to the to the blocking bore 74.

The opposite condition is illustrated in FIG. 6 of the drawings wherein the running fit required for the driving connection between the teeth 28 on the drive hub 26 and the teeth 30 on the gear hub 32 of the transmission pump 34 has not been achieved. In this condition, the turbine hub 42A can not translate axially along the stepped-down end portion 72 of the output shaft 14A a sufficient distance for the releasing surface 70 to be disposed in radial opposition to the blocking bore 74, even though the splines 44 on the turbine hub 42A have properly meshed with the splines 46 on the output shaft 14A to effect a driving connection between the turbine hub 42A and the output shaft 14A.

Rather, the blocking surface 68 on the cam flange 62 of the turbine hub 42A is disposed radially outwardly of the blocking bore 74 so that the blocking member 76 cannot move radially outwardly a sufficient distance to clear the threaded bore 52. So maintained by the blocking surface 68, the blocking member 76 precludes entry of the fastening bolt 50 into the threaded bore 52, and the person attempting to secure the torque converter unit 12 onto the output shaft 14A is made immediately aware that the torque converter is either improperly seated or misaligned with respect to the output shaft 14A or with respect to the driving connections made to the pump 34 and/or the power take-off. The only way the fastening bolt 50 can even engage the bore 52 to be tightened is to reposition the torque converter unit 12 on the output shaft 14A. When proper seating and/or alignment has been achieved, the releasing surface 70 will be disposed in radial opposition to the blocking bore 74, and that disposition will permit the blocking member 76 to withdraw from the threaded bore 52 so the fastening bolt 50 can enter the bore 52.

FIGS. 4 and 5 of the drawings depict two alternative embodiments of the structural arrangement by which to detect improper seating and/or alignment, and those figures are located in proximity to FIG. 3 which depicts the exemplary embodiment 10 heretofore described. The structural embodiment 110 depicted in FIG. 4 employs two, radially oriented, blocking bores 174A and 174B in the stepped-down end portion 172 of the output shaft 114A, and those blocking bores 174A and 174B are disposed at 180 degrees with respect to each other. Each blocking bore 174A and 174B also has a restriction 180A and 180B, respectively, similar to the restriction 80 depicted in FIG. 3. In addition, each bore 174A and 174B carries an individual blocking member 176A and 176B, respectively, each of which may also be in the form of a spherical ball that is free to move radially within its respective blocking bore 174A or 174B in order to protract radially inwardly through the respective opening 178A or 178B to block the axially oriented bore 52 and radially outwardly to cooperate with the cam flange 62.

A confining ring 182 cooperates with the restrictions 180A and 180B to retain the blocking members 176A and 176B within their respective blocking bores 174A and 174B. Here again, the proper interengagement between the turbine hub 42A on the torque converter unit 12 and the output shaft 114A is assured inasmuch as the fastening bolt 50 cannot enter the threaded bore 52 until the blocking members 176A and 176B translate radially outwardly to clear the threaded bore 52 in the turbine output shaft 114A, as is controlled by the radially innermost extent of the cam flange 62.

The structural embodiment 210 depicted in FIG. 5 employs three, radially oriented, blocking bores 274A, 274B and 274C in the stepped-down end portion 272 of the output shaft 214A, disposed at 120 degrees with respect to each other. Each blocking bore 274A, 274B and 274C also has its respective restriction 280A, 280B and 280C, similar to the restrictions 80 and 180 depicted in FIGS. 3 and 4. In addition, each bore 274A, 274B and 274C contains a blocking member 276A, 276B and 276C, respectively, each of which may also be in the form of a spherical ball that is free to move radially within its respective blocking bore 274A, 274B or 274C in order to protract radially inwardly through the respective opening 278A, 278B or 278C to block the axially oriented bore 52 and radially outwardly to cooperate with the cam flange 62. A confining ring 282 cooperates with the restrictions 280A, 280B and 280C to retain the blocking members 276A, 276B and 276C within their respective blocking bores 274A, 274B and 274C. Here again, the proper interengagement between the turbine hub 42A on the torque converter unit 12 and the output shaft 214A is assured, inasmuch as the fastening bolt 50 cannot enter the threaded bore 52 until the blocking members 276A, 276B and 276C translate radially outwardly to clear the threaded bore 52 in the turbine output shaft 214A, as is controlled by the radially innermost extent of the cam flange 62.

Figure 7:
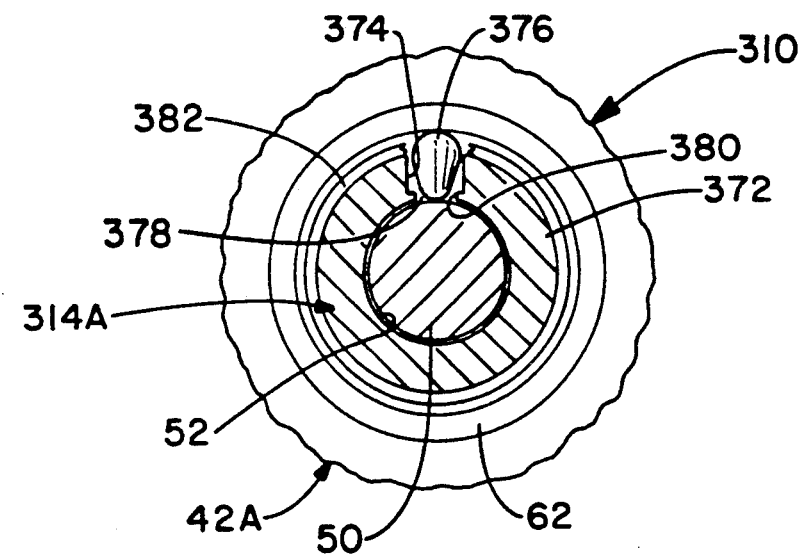

A third alternative embodiment of a structural arrangement embodying the concepts of the present invention is depicted in FIG. 7 and is identified by the numeral 310. The alternative embodiment 310, or aspects thereof, may be employed when the length of the individual, radially oriented, blocking bore 374 in the stepped-down end portion 372 of the output shaft 314A, irrespective of how many bores are employed, is such that a spherical ball would require a diameter greater than one might wish to employ. In that event, the blocking member 376 need not be a spherical ball but might rather be an elongated rod or even a teardrop shaped member, as depicted. In either event, the blocking member 376 must be free to move radially within its blocking bore 374 in order to protract radially inwardly through the opening 378 to block the axially oriented bore 52 and radially outwardly to cooperate with the cam flange 62. By utilizing an elongated blocking member 376 the bore 374 may be considerably smaller in diameter than would be required were the blocking member a single spherical element. In all other respects the structural arrangement 310 may be virtually identical to that employed by the other alternative arrangements previously described herein. For example, a constriction 380 and a confining ring 382 cooperate to retain the blocking member 376 within its blocking bore 374. Here again, the proper interengagement between the turbine hub 42A on the torque converter unit 12 and the output shaft 314A is assured inasmuch as the fastening bolt 50 cannot enter the threaded bore 52 until the blocking member 376 translates radially outwardly to clear the threaded bore 52 in the turbine output shaft 314A, as is controlled by the radially innermost extent of the cam flange 62.

While the invention is shown and described with respect to a torque converter unit and turbine output shaft, each of which has a rather specific configuration, the invention should not be considered as being limited to the specific environment shown in the drawings. As should now be apparent, other variations are possible, and the invention should only be limited by the scope of the appended claims. To that end, the present invention teaches that a structural arrangement can be provided which will not only detect and preclude improper seating and/or misalignment between driving connections effected when a torque converter is mounted on an output shaft but also that the other objects of the invention can be likewise accomplished.

The embodiments of the invention in which an exclusive property or privilege is claimed are defined as follows:

1. A structural arrangement for detecting improper positioning between a hub member mounted concentrically about the exterior of a shaft, said arrangement comprising: an axially oriented bore extending within the shaft to receive a fastening means by which the hub member may be secured to the shaft; a blocking bore extending radially of the shaft to communicate between said axially oriented bore and the exterior of the shaft; a blocking member received within said blocking bore and being movable radially therein; cam flange means provided on the interior of the hub member and presenting a blocking surface and a releasing surface on the radially inner extent thereof; said blocking surface being disposed radially of said blocking bore when the hub member is improperly positioned with respect to the shaft and said releasing surface being disposed radially of said blocking bore when the hub member is properly disposed with respect to the shaft; said blocking member having a radial dimension such that said blocking member will be forced to extend within said axially oriented bore so long as the blocking surface is radially opposed to said blocking bore in order to preclude the fastening means from being secured within the said axially oriented bore and yet said blocking member will retract to clear said axially oriented bore when said releasing surface is radially opposed to said blocking bore in order to permit the fastening means to enter said axially oriented bore.

2. A structural arrangement, as set forth in claim 1, wherein said blocking member comprises: a radially extended member disposed within said blocking bore.

3. A structural arrangement, as set forth in claim 2, wherein: two radially oriented blocking bores are provided in said stepped-down end portion of the turbine output shaft at 180 degrees with respect to each other and a blocking member is disposed within each of said blocking bores.

4. A structural arrangement, as set forth in claim 2, wherein: three radially oriented blocking bores are provided in said stepped-down end portion of the turbine shaft at 120 degrees with respect to each other and a blocking member is disposed within each of said blocking bores.

5. A device for detecting and preventing improper positioning between a hub member and the shaft about which the hub member is concentrically mounted, said device comprising: a stepped-down end portion on the shaft; an axially oriented bore extending within said stepped-down end portion of the shaft to receive a fastening means by which the hub member is secured to the shaft; a blocking bore extending radially through said stepped-down end portion to communicate between said axially oriented bore and the exterior of said stepped-down end portion; a blocking member received within said blocking bore and being movable radially therein; confining means associated with said blocking bore in combination with a restriction to maintain said blocking member within said blocking bore and yet to permit said blocking member to project radially inwardly from said blocking bore so as to extend into said axially oriented bore while simultaneously permitting said blocking member to extend radially outwardly from said blocking bore for a predetermined distance; a cam flange means provided on the radial interior of the hub member; a blocking surface and a releasing surface being provided on the radially innermost extent of said cam flange; said blocking surface being disposed radially of said blocking bore when the hub member is improperly positioned with respect to the shaft and said releasing surface being disposed radially of said blocking bore when the hub member is properly disposed with respect to the shaft; the radial dimension between said blocking surface and said axially oriented bore being such that said blocking member will be forced to extend within said axially oriented bore to preclude said fastening means from being secured within said axially oriented bore when said blocking surface is disposed in radial opposition with respect to said blocking bore; the radially dimension between said releasing surface and said axially oriented bore being such that said blocking member will retract within said blocking bore to clear said axially oriented bore so that said fastening means will be able to be secured within said axially oriented bore when said releasing surface is disposed in radial opposition with respect to said blocking bore.

6. A structural arrangement for detecting and preventing improper positioning of a torque converter on a turbine output shaft, said structural arrangement comprising: a torque transfer portion and an end portion on the turbine output shaft; said torque transfer portion having a first diameter and said end portion having a second diameter, said second diameter being lesser than said first diameter such that said end portion is stepped-down relative to said torque transfer portion; an axially oriented bore penetrating said stepped-down end portion of the turbine output shaft and adapted to receive a fastening means; a turbine hub presented from said torque converter and being received concentrically about said torque transfer portion of the turbine output shaft; a drive connection operative between said torque transfer portion of the turbine output shaft and said turbine hub; a cam flange extending radially inwardly from said turbine hub and terminating in a blocking surface and a releasing surface located axially adjacent to said blocking surface; said blocking and releasing surfaces intended to be disposed in radially outer opposition to said stepped-down end portion of the turbine output shaft; at least one blocking bore extending radially through said stepped-down end portion of the turbine output shaft and communicating between said axially oriented bore and the exterior of said stepped-down end portion; each said blocking bore opening into said axially oriented bore; a blocking member disposed within said blocking bore and freely movable axially therealong; a restriction at the radially inner extent of said blocking bore which permits said blocking member to project into said axially oriented bore but which prevents the blocking member from exiting radially inwardly from said blocking bore; confining means mounted about the exterior of said stepped-down end portion of the turbine shaft which retain said blocking member within said blocking bore but which permits said blocking member to project radially outwardly from said blocking bore to a predetermined extent; said blocking surface being disposed in radial opposition with respect to said blocking bore whenever said hub is improperly positioned on the turbine shaft; said blocking member being forced to project within said axially oriented bore by engagement with said blocking surface in order to preclude said fastening means from being secured within said axially oriented bore; said releasing surface being disposed in radial opposition with respect to said blocking bore whenever said hub is properly positioned on the turbine shaft; said blocking member being permitted to retract within said blocking bore by virtue of the radial opposition of said releasing surface with respect to said blocking bore whenever said hub is properly positioned on the turbine shaft in order to permit said fastening means to be secured within said axially oriented bore.

7. A structural arrangement, as set forth in claim 6, wherein said blocking member comprises: a ball disposed within said blocking bore.

8. A structural arrangement, as set forth in claim 6, wherein said confining means comprises: a ring having a tapered edge which retains said blocking member within said blocking bore while also allowing said blocking member to move radially outwardly to clear said axially oriented bore in said stepped-down end portion of the turbine shaft when said releasing surface is disposed in radial opposition to said blocking bore.

* * * * *